United States Patent [19]
Pecheyran et al.

[11] 3,764,827
[45] Oct. 9, 1973

[54] COUPLING DEVICE BETWEEN A DIGITAL COMPUTER AND AN ANALOGICALLY CONTROLLED INSTALLATION

[75] Inventors: Regis Pecheyran, Paris; Emile Fauvet, Champigny, both of France

[73] Assignee: GEC Elliot Automation S.A., Mulhouse, France

[22] Filed: Apr. 18, 1972

[21] Appl. No.: 245,054

[30] Foreign Application Priority Data
Apr. 19, 1971 France .............................. 7113687

[52] U.S. Cl. ................. 307/241, 307/311, 307/251, 328/71, 328/127
[51] Int. Cl. ........................................... H03k 17/56
[58] Field of Search .................... 307/241, 242, 251, 307/311; 328/71, 127

[56] References Cited
UNITED STATES PATENTS
3,508,224  4/1970  Putterman ..................... 307/241 X
3,582,943  6/1971  Weller ........................... 307/242 X
3,622,804  11/1971  Mitchell ......................... 307/242 X

*Primary Examiner*—John S. Heyman
*Attorney*—Flynn & Frishauf

[57] ABSTRACT

A coupling device for use between a digital computer supplying incremental control signals and a plurality of analog stations which are respectively controlled by analog control signals, said coupling device comprising, for each station, two photocouplings for receiving pulses representing the increasing variations and decreasing variations respectively, of said incremental control signals, and an integrator for receiving the outputs of said photocouplings to supply the corresponding analog quantities to the analog stations, the photocouplings being adapted to ensure a galvanic isolation between the analog stations themselves on the one hand and the analog stations in relation to the coupling on the other hand, while allowing a very short coupling occupation time.

6 Claims, 3 Drawing Figures

COUPLING DEVICE BETWEEN A DIGITAL COMPUTER AND AN ANALOGICALLY CONTROLLED INSTALLATION

FIELD OF THE INVENTION

This invention relates to a connection between a digital computer and an analogue installation for industrial process control or stations for the display or recording of physical quantities. More particularly it relates to an electro-optical coupling device usable for the transmission of signals to control or regulating stations and possibly address signals from these stations.

BACKGROUND OF THE INVENTION

The use of digital computers for entirely automatic control and the optimisation of industrial units is becoming more and more common.

For reasons of standardisation and reliability, the connection between the computer and the final control unit is very often made with analogue chains. It is always most desirable that the potentials of the couplings and of each chain should be floating. Information must therefore be transmitted via a device which allows the galvanic isolation of the chains involved. This device must also have a response time which is as low as possible in order to ensure a high rate of exchange.

In a general way it is possible to envisage two main types of control of digital computers over the analogue chains, viz: regulation point control and direct control. In both cases an output register of the digital computer shows the number of the station or regulator to be acted upon, and the new value to which the regulation point or the position of the regulated unit, as the case may be, is to be brought. This quantity can be given in the form of the new value itself or the difference between the previous value and the new value, the latter type of control being known as "incremental control."

The present invention particularly concerns this type of control known as "incremental control" but is not limited thereto.

In this type of control the information transmitted by the computer is presented in the form of pulses modulated in duration or amplitude. The invention makes use of pulses modulated in duration, the modulation in duration providing high immunity against interference while allowing information transmission over large distances.

PRIOR ART

At present various solutions exist for transmitting information in the form of pulses modulated in duration, by providing isolation between chains. Isolation can be achieved with the aid of miniature relays in tubes. The make and break times are in the order of a millisecond. In the case of dry contacts there is rebound on contact, and wet mercury contacts are sensitive to shocks and to inclination relative to the vertical. With such relays, the duration of the pulses transmitted must be in the order of 100 ms to minimize the influence of leakage on the make and break times. Because of the slowness of this device the rate of exchange with the computer is very low.

Isolation with the aid of a pulse transformer can also be envisaged, either using a wide band transformer which, to obtain a satisfactory field of variation for the pulse duration, must be large and supply distorted pulses, or by transmission of two pulses the interval of which is variable and represents the analogue quantity, but this solution leads to electronic circuits which are more complex, flip-flop circuits among others, and more sensitive to interference.

OBJECTS OF THE INVENTION

The invention has for an object to provide a coupling device allowing the transmission, with a very high speed of exchange, of pulses modulated in duration, i.e., of which the duration is proportional to the absolute value of the increment and the sign of which corresponds to the sign of the increment.

The invention is also intended to provide a coupling device of the type described above which is very well immunized against interference and which allows the transmission of information over great distances.

The invention is further intended to provide a coupling device of the type described above in which a very good definition of the control is obtained, 1/1000 of the control range when the maximum increment represents 25 percent of this range, for example.

A still further object of the invention is to provide a coupling device of this type allowing galvanic isolation between the chains or stations themselves and the chains or stations in relation to the coupling. This isolation allows the equipment faults to be limited in case of interference on one analogue chain or loop.

BRIEF SUMMARY OF THE INVENTION

According to the invention there is provided a coupling device between a digital computer supplying digital incremental control signals and a plurality of analogue stations, said coupling device comprising, for each station, two photocouplings for receiving pulses representing the increasing variations and decreasing variations respectively of said incremental control signals and an integrator for receiving the outputs of said photocouplings to supply the corresponding analogue quantities to the analog stations, the photocouplings being adapted to ensure a galvanic isolation between the analog chains or stations themselves on the one hand and the analog chains or stations in relation to the coupling on the other hand, while allowing a very short coupling occupation time.

The coupling device of the present invention offers the advantage of having a very low station addressing time, this time being hardly more than the duration of the pulse, which allows rapid release of the coupling and consequently the addressing of a large number of analog chains or stations per second.

BRIEF DESCRIPTION OF DRAWINGS

The present invention will be understood better with the aid of the following description of one particular embodiment given as an example and illustrated in the accompanying drawing in which.

DESCRIPTION OF EMBODIMENTS

Figure 1:
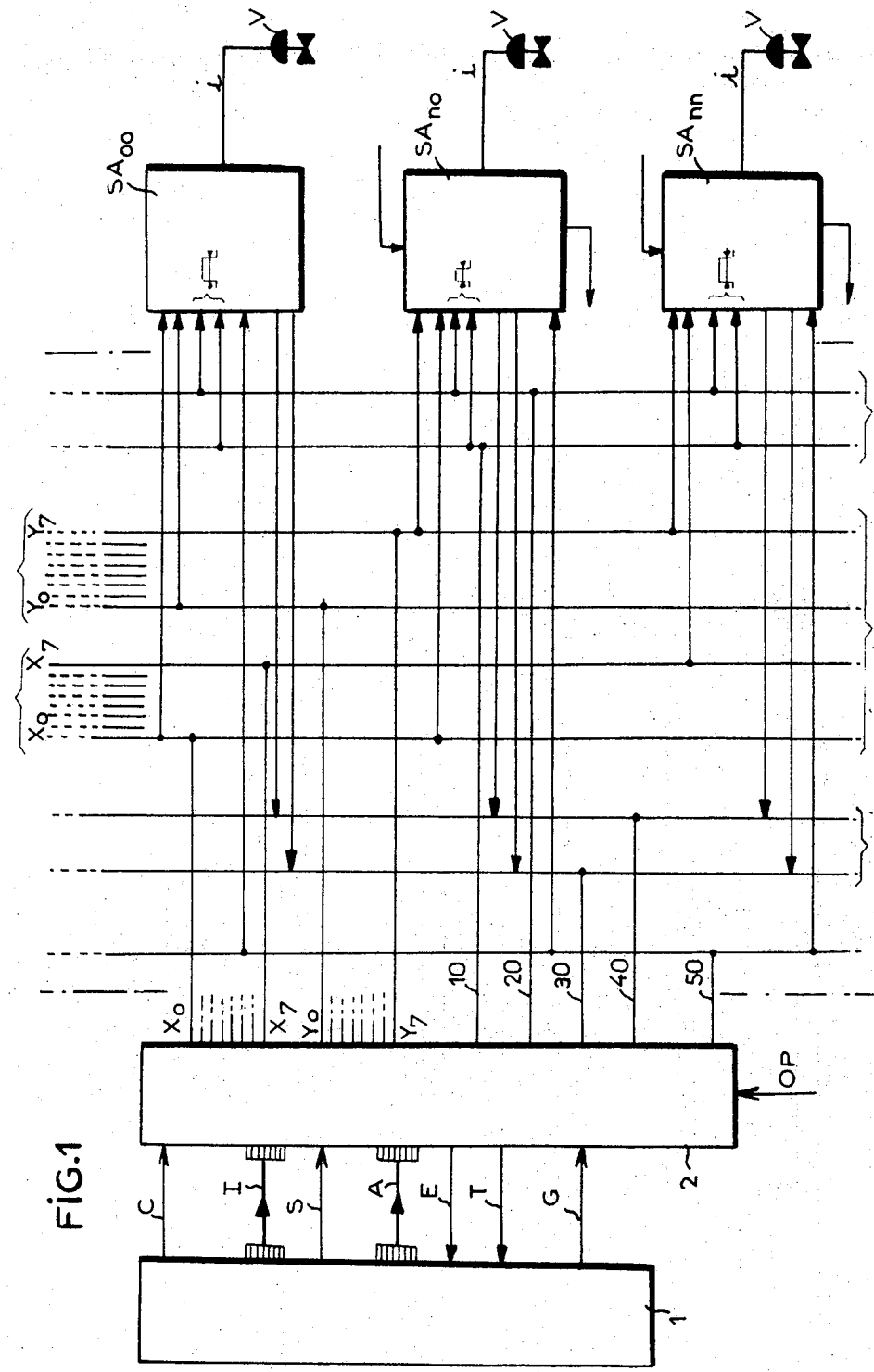
FIG. 1 is a block diagram representing the connection between a digital computer and analogue stations.

In FIG. 1 a digital computer is connected to the analogue stations $SA_{oo}-SA_{nn}$ by way of a coupling 2.

The computer 1 supplies the coupling 2 with: a validation signal of the contents of its output register or control bit C; an address signal, coded in pure binary, on the address line A, representing the station sequence number, this signal comprising 8 bits for addressing 256 stations; an updating or increment signal on the increment line I, this signal comprising 8 bits for a definition of 1/256 of the increment, the total increment representing at the maximum 25 percent of the control range of the regulated unit or a definition of 1/1024 with regard to the total range; and an increment bit, sign S. The computer can also supply a freezing signal G which allows all the stations to be locked in case of a fault on the computer.

The coupling 2 sends back to the computer 1 a sginal E of the situation of the station addressed comprising 1 bit and indicating whether this station is on computer operation or not; a signal T on the end of transfer with a station, this signal comprising 1 bit.

The coupling 2 exchanges with the stations an address signal transmitted by two groups of conductors $X_o$-$X_7$ and $Y_o$-$Y_7$; an increment signal transmitted by two wires 10, 20 to all the stations; a freezing control signal transmitted by a single wire 50 when this control is provided for at the computer output; and a station situation signal coming from the stations and transmitted to the coupling by two wires 30 and 40.

Station addressing is accomplished with a matrix structure. Each station receives a wire X and a wire Y, that is to say that for 64 stations, as is the case in the form of application illustrated, there must be 8 wires X and 8 wires Y available, for 256 stations 16 wires X and 16 wires Y are required, etc. An address code convertor is provided for in the coupling 2 to produce this addressing.

The coupling 2 also comprises a digital-duration modulation convertor which supplies pulses the duration of which represents the absolute increment value and the polarity of which represents the increment sign.

The freezing control is achieved by the use of a relay at station level. The coupling 2 also receives a signal OP representing the direct intervention of the operator for a general locking.

With the invention, the design of the coupling station assembly allows the use of an extremely simple "bus" distribution which limits the wires between the stations and the coupling 2 to the smallest possible number.

Figure 2:
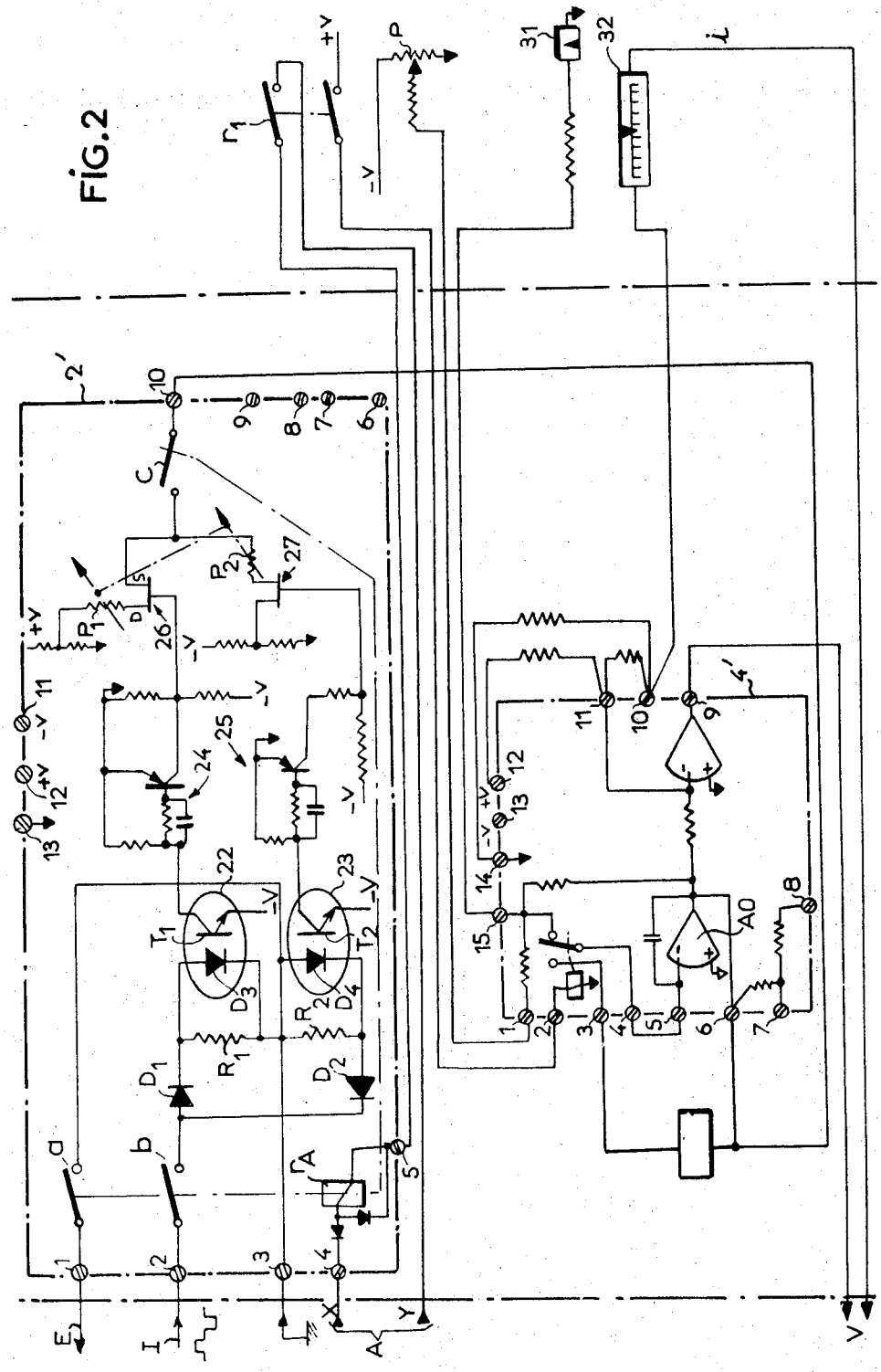
FIG. 2 is a detailed diagram of the coupling device in accordance with the invention between a digital computer and a regulator station.

FIG. 2 represents the detailed circuit diagram of a coupling device 2 at station level. This coupling device transmits a signal E of the situation of the station addressed and receives an increment signal I, made up of positive or negative pulses modulated in duration, and an address signal A. Addressing is achieved with the aid of relays. When the coupling calls station $X_iY_i$, the wire $X_i$ is linked to the potential 0 and the wire $Y_i$ to a potential +V. The addressing relay $r_A$ of station $X_iY_i$ is the only one to be actuated. It is, in this embodiment, a miniature relay with three dry contacts making and breaking in less than 1 ms. It must be impossible to actuate this relay except when the station is on computer operation, its coil also being connected in series with one or several contacts opening manually.

At the time of addressing, the contact b of the relay $r_A$ links the bus transmitting the increment signal I to the photocouplings effecting galvanic isolation of the station. The contact a connects the bus of the signal E (situation of the station) to the coupling, thus indicating to the coupling that the station is ready to receive the incremental signal. The contact c connects the analogue integrator 4' of the station to the integration control circuit, the integration being accomplished by an operational amplifier AO.

The addressing time must be slightly more than the time necessary for the increment transmission so as to take into account the relay delay; it will be in the order of 5 – 7 ms maximum.

This addressing relay allows the isolation of the stations from addressing circuits of the coupling and a low power stage for the control of the increment bus, whatever the number of stations since this can flow into only one coupling device at a time.

In addition the presence of the contact c of the relay at the output of the field effect transistors isolates these field effect transistors from the integrator input and consequently prevents the transmission of leakage currents and improves the quality of the analogue memory.

The coupling device 2' comprises two photocouplings 22, 23 which receive respectively the positive and negative pulses of the increment signal. Each photocoupling is made up by the connection in one box of a photo-emitter diode $D_3$, $D_4$ and a phototransistor $T_1$, $T_2$. These photocouplings are of the classical variety. Each photo-emitter diode is connected in parallel with a resistance $R_1$, $R_2$. Switching of the pulses of the increment signal is accomplished by two diodes $D_1$, $D_2$ polarised in opposite directions. The output current of the photocouplings is a function of the input current, these photocouplings being used on an all or nothing basis (presence or absence of pulse), the information to be transmitted is the duration of the pulse.

The minimum duration of the pulse is in the order of 10 to 15 s so that the rise, fall and delay times of the photocouplings are small in comparison. The maximal duration is 2 ms for an increment representing 12.5 percent of the range of the control unit, and 4 ms for an increment representing 25 percent of this range. These lengths can be further reduced by using faster photocouplings.

The output signals of the photocouplings 22, 23 are transmitted respectively to pulse shapers 24, 25 linked respectively to field effect transistors 26, 27 which control the integration, produced in circuit 4'. This integrator integrates a positive or negative voltage during the variable duration of the pulses and supplies a regulating current i to the part to be regulated which here is a valve. Between two pulses the integrator keeps in memory the analogue quantity. The field effect transistors 26, 27 act as switches. Their drain electrode is linked to a variable resistance $P_1$ or $P_2$ allowing the regulation of the integration resistance. These static switches have very low commutation times and leakage currents. They are only linked to the integrator input during addressing, and the analogue memory is also very good.

The right hand part of FIG. 2 illustrates the parts figuring on the front face of the station. The switch $r_1$ allows manual control when it is in the open position, and direct digital control when it is in the closed position.

The potentiometer P serves as the manual control. The reference 31 designates a balance indicator and reference 32 designates a device for measuring the output current $i$ being used for the regulation of the valve V.

Figure 3:
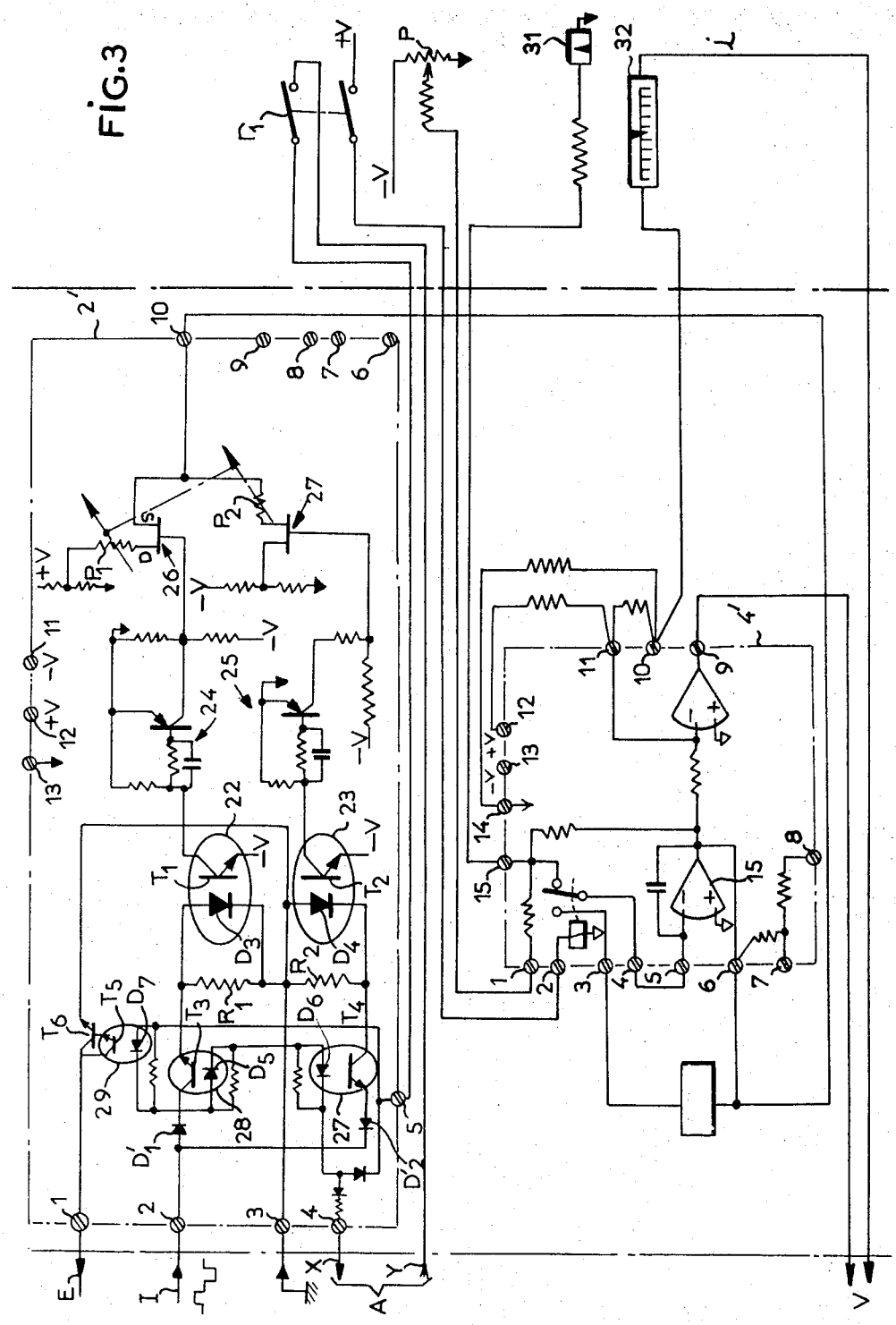
FIG. 3 illustrates another embodiment of the coupling device in accordance with the invention.

With the invention it is possible to use photo-couplings as a replacement for the relay to isolate the addressing circuits. In this case the addressing times can be very much reduced (only a few hundred $\mu s$ higher than those of the pulses). FIG. 3 illustrates such a variation. In FIG. 3, the relay $r_A$ is replaced by three photocouplings 27, 28, 29 comprising respectively a transistor $T_4$ and a diode $D_6$, a transistor $T_3$ and a diode $D_5$, and a transistor $T_5$ and a diode $D_7$. A transistor $T_6$ is controlled by the transistor $T_5$ of the photocoupling 29 and serves as an amplifier. To address a station an addressing current is transmitted on wire Y. This current passes across the dioded $D_5$, $D_6$ and $D_7$, making the transistors $T_3$, $T_4$, $T_5$ of the three photocouplings conductors, and comes out again by the wire X. When the transistor $T_5$ of the photocouplings 29 is a conductor, and therefore when the station is addressed, the transistor $T_6$ becomes a conductor and the wire E is linked to the coupling.

In this form of application the field effect transistors 26, 27 are not linked to the integrator by means of the contact $c$ of the relay $r_A$ and consequently must be chosen so that their leakage currents are extremely low in order not to noticeably diminish the quality of the memory function achieved by the integrator between two increments.

With the invention the use of photocouplings for transmitting information and a relay for addressing, allows very good galvanic isolation to be obtained avoiding any connection between the distribution of the signals to the analogue stations and the outputs of the computer. In addition the high rate of exchange, given by the device in the invention, allows the use of present computers in the best conditions by avoiding waste of time due to peripherals.

The increase in the scrutiny speed of the stations obtained thanks to the device in the invention allows a more frequent addressing of the stations, it then being possible to reduce the amplitude of the maximum increment. For example, a maximum increment of 62.5/1000 can be chosen; the maximum error introduced in the case of a fault in the computer will itself be reduced to this value. This advantage is considerable considering that the installation of digital computers is restricted, in this type of use, by the size of the risks in case of breakdown.

Moreover, the present device ensuring total islation between the machines situated in the control room and the machines situated in a dangerous area, enables inspection from the point of view of intrinsic safety to be effectively limited to one switching apparatus, e.g. the regulator or the command station.

Although the invention has been described with the help of one particular form of application, various modifications can be made within the scope of the invention as defined by the appended claims. For example, one can replace the phototransistors by photodiodes.

We claim:

1. A coupling device for use between a digital computer supplying digital incremental control signals and a plurality of anlaog stations which are respectively controlled by analog control signals comprising:

a digital-duration modulation converter responsive to digital incremental control signals and supplying pulses the duration and the polarity of which respectively represent the absolute value and the sign of said digital incremental control signals; and a plurality of analog signal generating sections, each signal generating section being associated with a respective analog station, each signal generating section including a pulse separating means having one input and first and second outputs; first and second photocoupling means each having respectively an input and an output, the first and second outputs of said pulse generating means being coupled to the inputs of said first and second photocoupling means respectively; and integrating means coupled to the outputs of said first and second photo-coupling means for integrating the outputs thereof and for supplying analog control signals as a function of said integration for said analog stations.

2. A coupling device according to claim 1 wherein each of said signal generating sections further comprise:

a pulse shaper means having first and second inputs and first and second outputs, said first and second inputs being coupled to the outputs of said first and second photocoupling means respectively; and first and second field effect transistors having respectively one input and one output, the inputs of said first and second field effect transistors being coupled to the first and second outputs of said pulse shaper means respectively and the outputs of said first and second field effect transistors being commonly connected to the input of said integrating means.

3. A coupling device according to claim 1 comprising photocoupling means coupled between the digital computer and each of said analog stations for addressing said analog stations.

4. A coupling device according to claim 1 wherein each of said photocoupling means comprises a light-emitting diode and a phototransistor responsive to said light-emitting diode.

5. A coupling device according to claim 4 wherein said light-emitting diode is a photo-emitter diode.

6. A coupling device according to claim 1 wherein said first and second photocoupling devices are responsive to positive and negative signals, respectively, from said pulse separating means.

* * * * *